US012567695B2

(12) United States Patent
Meyer

(10) Patent No.: US 12,567,695 B2
(45) Date of Patent: Mar. 3, 2026

(54) PLUG-IN CONNECTOR MODULE FOR A MODULAR INDUSTRIAL PLUG-IN CONNECTOR AND METHOD FOR PRODUCING SUCH A PLUG-IN CONNECTOR MODULE

(71) Applicant: HARTING ELECTRIC STIFTUNG & CO. KG, Espelkamp (DE)

(72) Inventor: Thorsten Meyer, Brokum (DE)

(73) Assignee: HARTING ELECTRIC STIFTUNG & CO. KG, Espelkamp (DE)

(*) Notice: Subject to any disclaimer, the term of this patent is extended or adjusted under 35 U.S.C. 154(b) by 416 days.

(21) Appl. No.: 18/253,738

(22) PCT Filed: Nov. 8, 2021

(86) PCT No.: PCT/DE2021/100888
§ 371 (c)(1),
(2) Date: May 19, 2023

(87) PCT Pub. No.: WO2022/105958
PCT Pub. Date: May 27, 2022

(65) Prior Publication Data

US 2023/0420883 A1 Dec. 28, 2023

(30) Foreign Application Priority Data

Nov. 23, 2020 (DE) ..................... 10 2020 130 915.5

(51) Int. Cl.
*H01R 13/514* (2006.01)
*B29C 59/14* (2006.01)
(Continued)

(52) U.S. Cl.
CPC ......... *H01R 13/514* (2013.01); *B29C 59/142* (2013.01); *H01R 13/518* (2013.01); *H01R 43/24* (2013.01); *B29C 2059/145* (2013.01)

(58) Field of Classification Search
CPC .... H01R 13/514; H01R 13/518; H01R 43/24; H01R 13/53; B29C 59/142;
(Continued)

(56) References Cited

U.S. PATENT DOCUMENTS 8,854,835 B2 * 10/2014 Feldstein ............. H01R 12/724 174/355
10,374,340 B2 * 8/2019 Cook ................... A61B 5/6858
(Continued)

FOREIGN PATENT DOCUMENTS

DE 10042566 A1 3/2002
DE 102010025958 A1 1/2012
(Continued)

OTHER PUBLICATIONS

International Preliminary Report on Patentability, dated May 16, 2023, for International Application No. PCT/DEC2021/100888. (7 pages).
(Continued)

*Primary Examiner* — Truc T Nguyen
(74) *Attorney, Agent, or Firm* — Seed Intellectual Property Law Group LLP

(57) ABSTRACT

A plug-in connector module for a modular industrial plug-in connector is provided, wherein the plug-in connector module has a housing with a housing surface, wherein the housing consists substantially of plastic, wherein the plug-in connector module has at least one electrical contact element, wherein the housing has at least one contact chamber with a contact chamber surface, wherein the at least one electrical contact element is arranged in the contact chamber, wherein at least a portion of the contact chamber surface and/or at least a portion of the housing surface are/is plasma-modified. A method for producing a plug-in connector module of an industrial plug-in connector is also provided and
(Continued)

includes: producing a plastics housing with a housing surface and at least one contact chamber for receiving a contact element, modifying at least a portion of the housing surface and/or at least a portion of the contact chamber surface with an atmospheric pressure plasma with a working gas being fed in.

9 Claims, 2 Drawing Sheets

(51) Int. Cl.
*H01R 13/518* (2006.01)
*H01R 43/24* (2006.01)

(58) Field of Classification Search
CPC ................ B29C 2059/145; B29C 59/14; C08J 2369/00; C08J 7/14; C08J 7/18
See application file for complete search history.

(56) References Cited

U.S. PATENT DOCUMENTS

| | | | | |
|---|---|---|---|---|
| 11,670,891 B2 * | 6/2023 | Asano | H01R 13/6581 | 439/55 |
| 12,404,544 B2 * | 9/2025 | Tentori | C12Q 1/6876 | |
| 2010/0240253 A1 * | 9/2010 | Kast | A61N 1/0551 | 29/857 |
| 2013/0344736 A1 * | 12/2013 | Latunski | H01R 43/005 | 29/842 |
| 2014/0080331 A1 * | 3/2014 | Jeon | H01R 13/658 | 439/55 |
| 2014/0220797 A1 * | 8/2014 | Rathburn | H01R 13/2442 | 29/846 |
| 2021/0265766 A1 | 8/2021 | Kliever et al. | | |

FOREIGN PATENT DOCUMENTS

| | | |
|---|---|---|
| DE | 102010040827 A1 | 3/2012 |
| DE | 102016223995 A1 | 6/2018 |
| DE | 102018115371 A1 | 1/2020 |
| EP | 0825683 A2 | 2/1998 |
| WO | WO 9901935 A1 | 1/1999 |

OTHER PUBLICATIONS

International Search Report and Written Opinion, mailed Feb. 8, 2022, for International Patent Application No. PCT/DE2021/100888. (15 pages) (with English Translation).

* cited by examiner

PLUG-IN CONNECTOR MODULE FOR A MODULAR INDUSTRIAL PLUG-IN CONNECTOR AND METHOD FOR PRODUCING SUCH A PLUG-IN CONNECTOR MODULE

BACKGROUND

Technical Field

The present disclosure is directed to a plug-in connector module for a modular industrial plug-in connector. The present disclosure also relates to a method for producing a plug-in connector module.

Such plug-in connector modules are required as a component of a plug-in connector modular system in order to be able to adapt a plug-in connector, in particular a heavy-duty industrial plug-in connector, in a flexible manner to specific requirements with respect to the signal and energy transmission, for example, between two electrical devices. Generally, to this end, plug-in connector modules are inserted into corresponding retention frames which are referred to occasionally as articulated frames, module frames or modular frames. The retention frames consequently serve to receive a plurality of plug-in connector modules which may be identical to each other and/or also different from each other and to secure them safely to a surface and/or a device wall and/or in a plug-in connector housing or the like.

Prior Description of the Related Art

The plug-in connector modules generally have a substantially parallelepipedal insulating member or a parallelepipedal housing. This insulating member or housing may, for example, act as a contact carrier and receive and fix contact elements of extremely different types. The function of a plug-in connector formed thereby is thus very flexible. For example, pneumatic modules, optical modules, modules for transmitting electrical energy and/or electric analogue and/or digital signals may be received in the respective insulating member or housing and thus be used in the plug-in connector modular system. Increasingly, plug-in connector modules also perform measurement and technical data functions.

In an optimum manner, retention frames which are formed by two frame halves which are connected to each other in an articulated manner are used. The plug-in connector modules are provided with substantially rectangular retention means which protrude at the narrow sides. In the side portions of the frame halves, there are provided recesses which are in the form of openings which are closed at all sides and into which the retention means extend when the plug-in connector modules are inserted into the retention frame. In order to insert the plug-in connector modules, the retention frame is folded open, that is to say, opened, wherein the frame halves are folded open about the articulations only to such an extent that the plug-in connector modules can be inserted. Subsequently, the frame halves are folded together, that is to say, the retention frame is closed, wherein the retention means extend into the recesses and a secure, positive-locking retention of the plug-in connector modules in the retention frame is brought about.

The modular industrial plug-in connectors described above provide a high level of flexibility and can be configured for extremely varied fields of application by plug-in connector modules with different functions being installed together in a common retention frame. The number of plug-in connector module places in a retention frame is, however, limited. The flexibility of an industrial plug-in connector is thereby limited.

The housings of the known plug-in connector modules all have substantially the same geometry at least with respect to the width and length thereof within the fixing plane of the articulated frame. This is substantiated in that each plug-in connector module has to be able to be inserted in each installation location of the retention or articulated frame.

In order to provide such a plug-in connector modular system with an even greater degree of flexibility without having to increase the structural size of an industrial plug-in connector, the document DE10 2018 115 371 A1 proposes halving the housings of the plug-in connector modules and joining two housing halves geometrically to form a plug-in connector module suitable for the known retention frames. Each half acts in this instance as an independent functional unit and consequently forms an independent, geometrically smaller plug-in connector module.

It is easily possible to reduce the geometry of the housings of the plug-in connector modules in order to be able to insert more different plug-in connector modules into the known retention frames.

However, such a miniaturization is not possible to the same extent for electrical contact elements. As a result of miniaturization of plug-in connector modules, the following problems may arise:

Some electrical contact elements must have a specific size and geometry in order to ensure a desired current-carrying capacity. Such contact elements are also called power contact elements. In plug-in connector modules, the housings also have the function of an insulating member. The housings generally comprise plastics material. As a result of a smaller geometry of the housings, the power contact elements are no longer surrounded by sufficient plastics material so that the air gaps and creepage distances relative to adjacent contact elements within the plug-in connector module and/or an adjacent plug-in connector module cannot be complied with.

Other contact elements are used to transmit high quantities of data. These contact elements are also referred to as signal contact elements. In order to prevent so-called cross-talk between adjacent signal contact elements, such contact elements have to be accordingly shielded from each other. This is often carried out by a metal sheet and/or sufficient spacing with respect to adjacent contact elements. A miniaturization of the plug-in connector module housings or insulating members makes this task more difficult.

The document DE 100 42 566 A1 sets out how plastics material surfaces as a result of a chemical modification have, for example, better adhesion or anti-adhesion. Materials which enter into a reaction with the surface of the plastics material and/or penetrate into the surface as a result of interdiffusion and/or melt on the surface are used as modification substance(s).

The document DE 10 2010 025 958 A1 sets out methods for producing a plastics material component with a predetermined surface nature. In this instance, a plastically deformable plastics material with a suitable tool is applied to a surface to be modified.

The document DE 10 2010 040 827 A1 sets out a method in which chemical compounds with electrophilic molecular groups are applied to a plastics material surface. These plastics materials are, for example, used in the automotive industry for body components.

The document DE 10 2016 223 995 A1 sets out a retention frame for retaining plug-in connector modules and for installation in a plug-in connector housing, wherein the plug-in connector modules are then retained in a positive-locking manner in the retention frame by the retention means.

BRIEF SUMMARY

Embodiments of the present disclosure provide compact and nonetheless reliable plug-in connector modules. The plasma modification described herein is carried out with a thermal plasma, a so-called atmospheric pressure plasma. Such a plasma can be produced in a cost-effective manner for industrial production processes and can be used safely and in a controlled manner. A corresponding plasma nozzle can also be retrofitted in most production lines.

The plasma beam is produced in this instance by a high-current electric arc which is operated between a rod-like cathode and an anode which acts as a nozzle, the so-called plasmatron, and which heats the passing working gas to approximately 10,000 K and accelerates it as a result of thermal expansion to some 100 m/s. The high-current electric arc between the cathode and anode is ignited by a high-frequency discharge. A current-free plasma beam at a high temperature and high speed is discharged from the nozzle. A great variety of working gases can be used. The respective gas flows are adjusted and kept constant by a so-called mass flow controller. As a result, a reproducible plasma beam can be produced. One characteristic of the atmospheric pressure/plasma beam is the high speed at the nozzle outlet, caused by the high temperatures and the small nozzle diameter. The higher the selected gas pressure is adjusted, the less influence the environment gas (ambient air) has on the plasma modification. Gas pressures up to 10 Pa have been found to be very advantageous.

In some embodiments, plasma modification of a member, for example, a plug-in connector module housing, is intended to be understood to mean that the surface of the member in contrast to the lower-lying base material (referred to as bulk material) is chemically modified or changed. This involves an object being able to be produced from a conventional material in a known production method. With a plasma modification, the properties (chemical or physical) in the surface region of the object can subsequently be optimized. With a material, as produced by the plasma modification, the object would generally not have been able to be produced. Therefore, the disclosure described herein makes provision for the known materials and production methods to be used and for optimized properties to be generated by a plasma modification.

A surface can be plasma-modified using a plasma beam. This means that the surface, on the one hand, is chemically changed. On the other hand, the roughness of the plasma-modified surface is also changed. A plasma modification takes place only on the surface of the member which is exposed to the plasma beam. The surface in this instance is intended to be understood to refer to a depth of up to a maximum of 500 μm. Generally, even less, that is to say, only 100-200 μm of the surface is chemically modified. The basic structure or the base material of the member is not influenced by the plasma treatment.

The housing of the plug-in connector module comprises plastics material. In this instance, a polycarbonate, which is illustrated in the following chemical structural formula, is generally used.

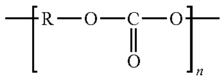

The R in the structural formula stands for the "balance" of the dihydroxy compound used for the synthesis of the polycarbonate.

Advantageously, at least a portion of the contact chamber surface and/or at least a portion of the housing surface of the housing has a higher concentration of carbon double bonds than the underlying base material of the housing. As a result of the increased number of carbon double bonds, in the modified regions the conductivity of the surface of the housing is increased. In these regions, electromagnetic fields are thereby shielded. A so-called electrical crosstalk of two adjacent plug-in connector modules is, for example, thereby prevented or at least reduced, whereby the data integrity of the plug-type connector module is on the whole improved.

A plasma modification can also be implemented by the material which is intended to be modified, for example the surface of an insulating member, being wetted with a chemical solution and the surface subsequently being subjected to a plasma or a plasma beam. In this instance, the working gas can be varied. Thus, for example, two chemical materials, a material in the solution and a material in the working gas, can be combined to form a reaction. In the chemical solution, for example, metals or metal compounds may be dissolved so that a surface which is treated in this manner receives metallic, such as conductive properties.

Advantageously, at least a portion of the contact chamber surface and/or at least a portion of the housing surface has a lower concentration of oxygen compounds than the underlying base material of the housing. As a result of a plasma treatment, for example, with an inert gas as a working gas, oxygen compounds in the surface region can be removed. Valence electrons which have been released thereby can be converted into a carbon double bond. On the one hand, as described above, the conductivity of the material is thereby increased. Furthermore, the surface of the housing and/or the surface of the contact chambers becomes less hydrophilic (hygroscopic). A plug-in connector which is provided with such plug-in connector modules is thereby less sensitive to moisture.

In some advantageous embodiments, at least a portion of the contact chamber surface and/or at least a portion of the housing surface has a higher concentration of fluorine compounds than the underlying base material of the housing. This can be carried out, for example, by a fluorine-containing working gas. The fluorine compounds produce a highly hydrophobic surface. This leads not only to a higher moisture resistance of the plug-in connector. It has been found that plug-in connector modules which have been surface-modified in this manner become less rapidly contaminated than untreated plug-in connector modules. Surprisingly, it has further been found that, as a result of the covalent fluorine compounds on the surface of the housing and/or the contact chamber, the creepage current resistance of the plug-in connector module—in comparison with an untreated housing—is on the whole increased. Fluorine-containing materials are not permitted in most application fields. In the case of a surface which has been modified with fluorine plasma, however, the fluorine proportion is such a small proportion of the overall ratio that in this instance the marginal limit is complied with. Therefore, plug-in connector modules which have been plasma-modified in this manner can also be marketed.

The plug-in connector module described herein can be produced in the following manner:

Firstly, a plastics material housing is produced, for example, with an injection-molding process. The plastics material housing has a housing surface and at least one contact chamber for receiving a contact element.

Subsequently, at least a portion of the housing surface and/or at least a portion of the contact chamber surface is modified with an atmospheric pressure plasma with a working gas being supplied. In this instance, the region of the housing which is intended to be modified is exposed to the plasma gas of a corresponding plasma nozzle with a defined spacing and a defined time. Such a plasma nozzle may be integrated in any industrial production line.

It has been found that, in order to modify plug-in connector module housings, a spacing of from two to four centimeters is sufficient.

The plug-in connector housing is, for example, moved along a conveyor belt below the plasma beam of the plasma nozzle. It has been found that a conveyor belt speed between 0.1 m/s and 3 m/s provides an adequate modification duration for the housing.

If an inert gas, for example, argon, is used as a working gas, no safety devices, such as a gas extraction in the modification region need to be provided. If a fluorine-containing gas is used as the working gas, however, a corresponding gas extraction has to be provided if people are permanently in the building.

The plasma modification can equally also be used for insulating members of a plug-in connector. Such insulating members are also from with a housing surface and at least one contact chamber having a contact chamber surface. In some embodiments, at least a portion of the contact chamber surface and/or at least a portion of the housing surface is plasma-modified. All variants which have already been set out above with regard to plug-in connector modules can also be transferred to insulating members of plug-in connectors.

A plasma modification of the insulating member with an inert gas as a working gas is particularly advantageous in data plug-in connectors. Contact chambers can thereby be arranged closer to each other, whereby the plug-in connectors can be constructed to be smaller and/or more contact elements can be accommodated in the same structural space. Furthermore, shielding metal components, for example, a shielding metal plate, can thereby be saved, whereby such plug-in connectors, in spite of plasma treatment, can be produced in more cost-effective manner. Sometimes, a metal housing can even be dispensed with and a plastics material housing can be selected.

A plasma modification of the insulating member with a fluorine-containing working gas is particularly advantageous with power plug-in connectors. As already mentioned above, as a result of such a plasma treatment, a greater creepage current resistance is achieved. Such plug-in connectors, with the same number of contact elements, can thereby be constructed in a more compact manner. Furthermore, the contact elements of the plug-in connector can be acted on with higher currents, which may be advantageous in particular with car charging plug-in connectors in order to shorten the charging duration.

BRIEF DESCRIPTION OF THE SEVERAL VIEWS OF THE DRAWINGS

Embodiments of the disclosure are illustrated in the drawings and will be explained in greater detail below.

The figures may contain partially simplified, schematic illustrations. Sometimes identical reference numerals are used for elements which may be the same but where applicable not identical. Different views of the same elements could be scaled differently.

DETAILED DESCRIPTION

Figure 1:
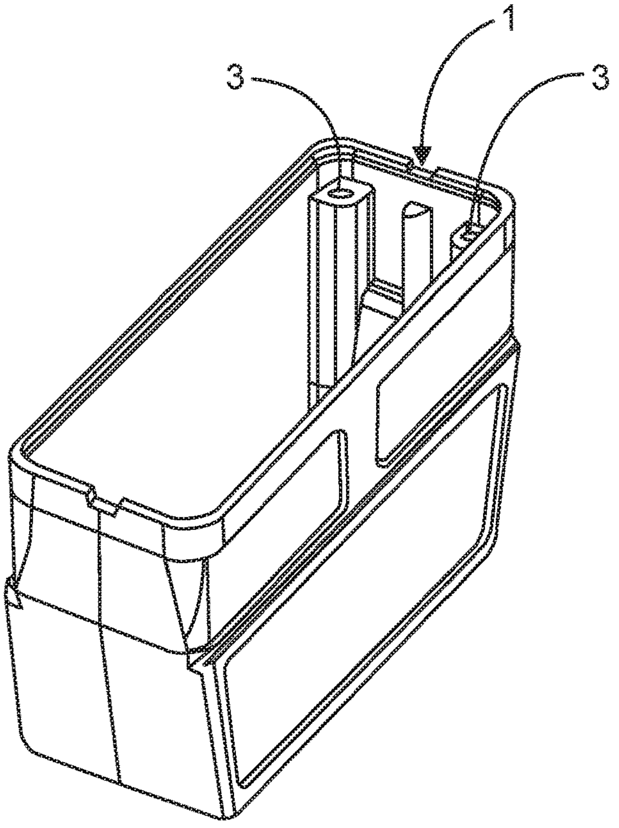
FIG. 1 shows a perspective illustration of a plug-in connector housing of an industrial plug-in connector.

FIG. 1 shows a plug-in connector housing 1 of an industrial plug-in connector. The plug-in connector housing 1 generally comprises a metal material and is typically produced with a zinc die-casting method. Such a plug-in connector housing 1 is robust and has good electromagnetic shielding properties and is therefore particularly suitable for harsh industrial environments.

Figure 2:
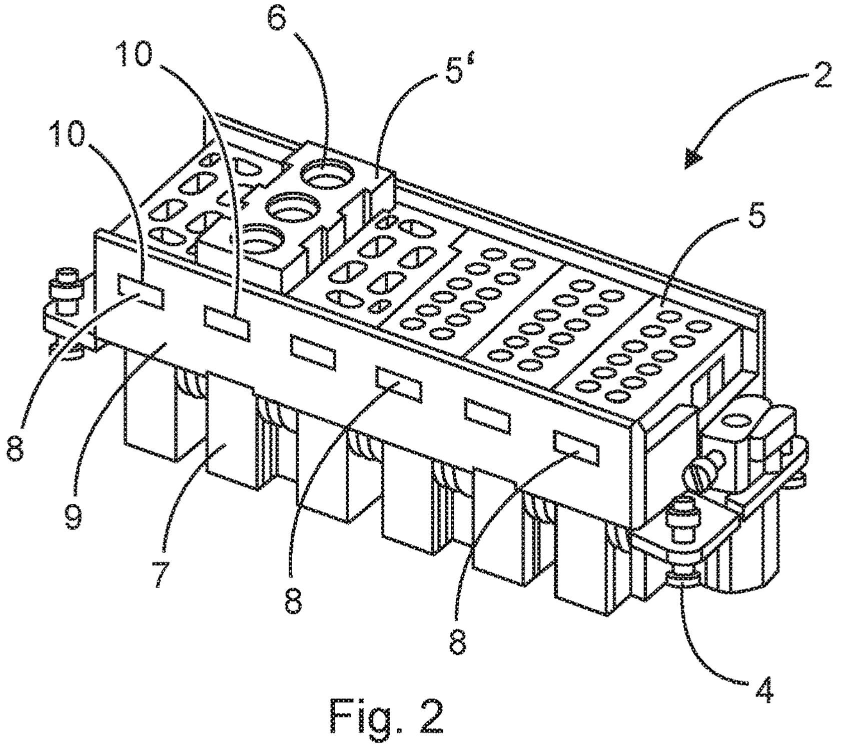
FIG. 2 shows a perspective illustration of a retention frame which is provided with different plug-in connector modules.

In FIG. 2, a retention frame 2 which is provided with different plug-in connector modules 5' can be seen. The retention frame 2 has a frame-like form and has screws 4 at the corner regions thereof in each case. The plug-in connector housing 1 has a substantially rectangular cross-section and has corresponding threaded holes 3 in the housing interior in the corner regions thereof. The retention frame 2 can be secured in the plug-in connector housing 1 by the screws 4, together with the associated threaded holes 3.

The plug-in connector modules 5 shown in FIG. 2 can be optimized as described above by a plasma modification. It is thus recommended to provide so-called data modules, which have to transmit the data signals at high frequency, with an inert gas plasma treatment. The signal contact elements which are used in this instance are thus protected from electromagnetic interference fields. Adjacent plug-in connector modules are also protected in the same manner by the data module itself.

Plug-in connector modules 5 which are provided with power contact elements for power transmission can be improved with a plasma treatment with a fluorine-containing working gas. The fluorinated surface optimizes the creepage distances or the creepage current resistance of the plug-in connector module 5. More power contact elements can thereby be accommodated in a plug-in connector module 5 than with untreated plug-in connector modules. Furthermore, such plug-in connector modules 5 can be inserted without risk directly adjacent to each other in the retention frame 2 or in the plug-in connector housing 1.

Figure 3:
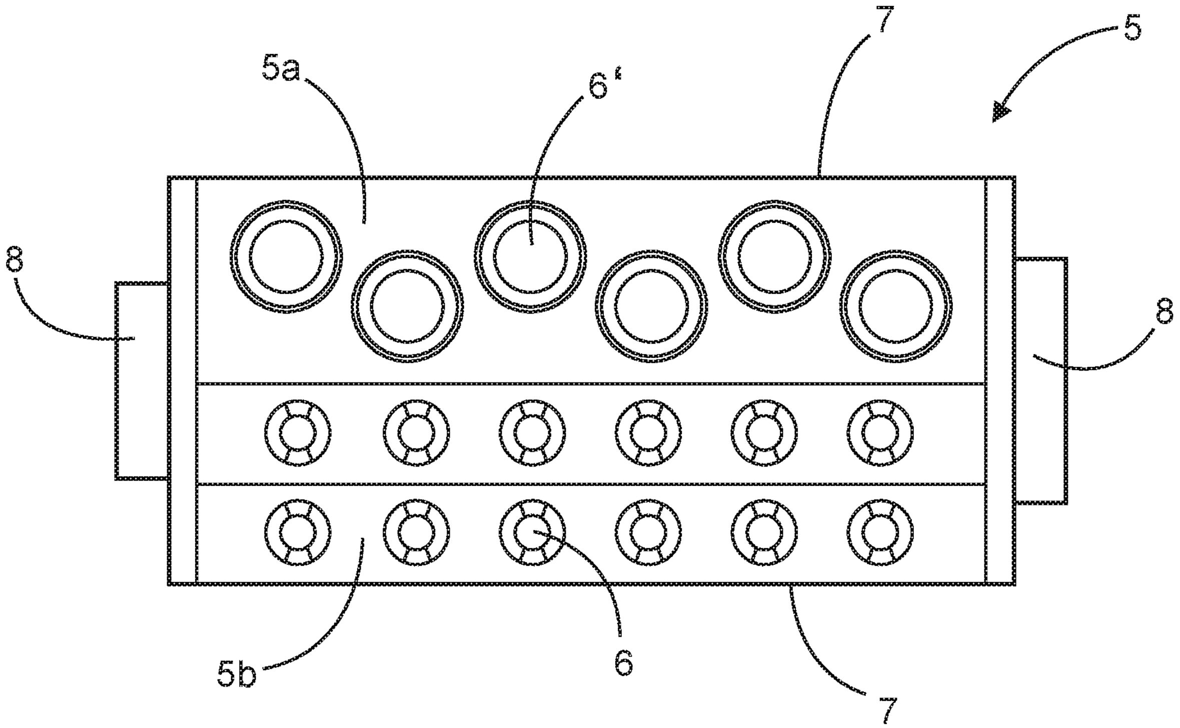
FIG. 3 shows a plan view of a plug-in connector module which is composed of two plug-in connector module halves.

In FIG. 3, another embodiment of a plug-in connector module 5' can be seen. The plug-in connector module 5' has the conventional geometry or size of plug-in connector modules for modular plug-in connectors which are marketed by different manufacturers. The plug-in connector module 5' is composed of two plug-in connector module halves **5*a*, 5*b*. The dividing plane extends in the embodiment illustrated in this instance along the longitudinal axis of the plug-in connector module 5'**. However, a division along the transverse axis may also be provided in a symmetrical or non-symmetrical manner.

In the embodiment shown here, the plug-in connector module half **5*a* is provided with power contact elements (not shown) which are arranged in the contact chambers 6'. The plug-in connector module half 5*a* has been improved with a plasma modification in which fluorine-containing working gas was used. In this instance, the surface of the housing and the surface of the contact chambers 6'** were modified with the corresponding plasma.

The other plug-in connector module half 5*b* is provided with signal contact elements (not shown) which are arranged in the contact chambers 6. The plug-in connector module half 5*b* was subjected to a plasma modification, wherein an inert gas was used as the working gas. In this instance, the surface of the housing and the surface of the contact chambers 6' were modified with the corresponding plasma.

As a result of the above-described plasma modification of the plug-in connector module halves 5*a*, 5*b*, signal contact elements and power contact elements can be mixed with each other in the plug-in connector module 5'. Furthermore, more contact elements overall can be accommodated in the plug-in connector module 5' since electromagnetic interference factors can be reduced and creepage distances can be optimized.

Even if various aspects or features of the disclosure are shown in each case in combination in the figures, it is evident for the person skilled in the art—unless stated otherwise—that the combinations illustrated and discussed are not the only possible ones. In particular, mutually corresponding units or combinations of features from different embodiments can be changed for each other. In other words, aspects of the various embodiments described above can be combined to provide further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A plug-in connector module for a modular industrial plug-in connector, the plug-in connector module comprising:

a housing having a housing surface, wherein the housing comprises polycarbonate; and at least one electrical contact element, wherein the housing has at least one contact chamber having a contact chamber surface, wherein the at least one electrical contact element is arranged in the contact chamber, and wherein at least a portion of the contact chamber surface and/or at least a portion of the housing surface is plasma-modified.

2. A plug-in connector module for a modular industrial plug-in connector, the plug-in connector module comprising:

a housing having a housing surface, wherein the housing substantially comprises plastics material; and at least one electrical contact element, wherein the housing has at least one contact chamber having a contact chamber surface, wherein the at least one electrical contact element is arranged in the contact chamber, wherein at least a portion of the contact chamber surface and/or at least a portion of the housing surface is plasma-modified, and wherein at least a portion of the contact chamber surface and/or at least a portion of the housing surface has a higher concentration of carbon double bonds than the underlying base material of the housing.

3. A plug-in connector module for a modular industrial plug-in connector, the plug-in connector module comprising:

a housing having a housing surface, wherein the housing substantially comprises plastics material; and at least one electrical contact element, wherein the housing has at least one contact chamber having a contact chamber surface, wherein the at least one electrical contact element is arranged in the contact chamber, wherein at least a portion of the contact chamber surface and/or at least a portion of the housing surface is plasma-modified, and wherein at least a portion of the contact chamber surface and/or at least a portion of the housing surface has a lower concentration of oxygen compounds than the underlying base material of the housing.

4. A plug-in connector module for a modular industrial plug-in connector, the plug-in connector module comprising:

a housing having a housing surface, wherein the housing substantially comprises plastics material; and at least one electrical contact element, wherein the housing has at least one contact chamber having a contact chamber surface, wherein the at least one electrical contact element is arranged in the contact chamber, wherein at least a portion of the contact chamber surface and/or at least a portion of the housing surface is plasma-modified, and wherein at least a portion of the contact chamber surface and/or at least a portion of the housing surface has a higher concentration of fluorine compounds than the underlying base material of the housing.

5. A plug-in connector module for a modular industrial plug-in connector, the plug-in connector module comprising:

a housing having a housing surface, wherein the housing substantially comprises plastics material; and at least one electrical contact element, wherein the housing has at least one contact chamber having a contact chamber surface, wherein the at least one electrical contact element is arranged in the contact chamber, wherein at least a portion of the contact chamber surface and/or at least a portion of the housing surface is plasma-modified, and wherein the plug-in connector module comprises two plug-in connector module halves.

6. A method for producing a plug-in connector module of an industrial plug-in connector, the method comprising:

producing a plastics material housing having a housing surface and at least one contact chamber for receiving a contact element; and modifying at least a portion of the housing surface and/or at least a portion of the contact chamber surface with an atmospheric pressure plasma with a working gas being supplied, wherein an inert gas or a fluorine-containing gas or a mixture thereof is used as the working gas.

7. A method for producing a plug-in connector module of an industrial plug-in connector, the method comprising:

producing a plastics material housing having a housing surface and at least one contact chamber for receiving a contact element; and modifying at least a portion of the housing surface and/or at least a portion of the contact chamber surface with an atmospheric pressure plasma with a working gas being supplied, wherein argon is used as the inert gas and tetrafluoroethylene is used as the fluorine-containing gas.

8. A method for producing a plug-in connector module of an industrial plug-in connector, the method comprising:

producing a plastics material housing having a housing surface and at least one contact chamber for receiving a contact element; and modifying at least a portion of the housing surface and/or at least a portion of the contact chamber surface with an atmospheric pressure plasma with a working gas being supplied, wherein the plug-in connector module is composed of two plug-in connector module halves.

9. A method for producing a plug-in connector module of an industrial plug-in connector, the method comprising:

producing a plastics material housing having a housing surface and at least one contact chamber for receiving a contact element; and modifying at least a portion of the housing surface and/or at least a portion of the contact chamber surface with an atmospheric pressure plasma with a working gas being supplied, wherein the housing surface and/or the contact chamber is/are first wetted with a chemical solution and a plasma modification is subsequently carried out.

* * * * *